United States Patent [19]

Vasanoja

[11] Patent Number: 5,504,671
[45] Date of Patent: Apr. 2, 1996

[54] RADIO SYSTEM COMBINER FILTER CONTROL SYSTEM WHEREIN PLURAL AUXILIARY CARDS AUTOMATICALLY OBTAIN CORRECT ADDRESS FROM MOTHERBOARD UPON BEING INSERTED IN RESPECTIVE AUXILIARY CARD CONNECTORS

[75] Inventor: Juha Vasanoja, Oulu, Finland

[73] Assignee: Nokia Telecommunications, Espoo, Finland

[21] Appl. No.: 290,830

[22] PCT Filed: Dec. 17, 1993

[86] PCT No.: PCT/FI93/00545

§ 371 Date: Aug. 15, 1994

§ 102(e) Date: Aug. 15, 1994

[87] PCT Pub. No.: WO94/05832

PCT Pub. Date: Mar. 17, 1994

[30] Foreign Application Priority Data

Dec. 18, 1992 [FI] Finland ..................... 925779

[51] Int. Cl.⁶ ..................... G05B 19/042; G06F 9/00
[52] U.S. Cl. ..................... 364/140; 364/138; 364/DIG. 2; 364/929.4; 364/929.5; 395/822; 395/829
[58] Field of Search ..................... 364/140, 141, 364/131, 132, 133, 134, 138, 139, DIG. 1 MS File, DIG. 2 MS File; 395/822, 829

[56] References Cited

U.S. PATENT DOCUMENTS 4,628,437  12/1986  Poschmann et al. ............... 364/138 X
4,670,855  6/1987  Caprio et al. ..................... 364/900
4,726,071  2/1988  Jackowski ........................ 455/125
4,813,014  3/1989  DeBell .............................. 365/45
4,905,182  2/1990  Fitch et al. ..................... 364/DIG. 2
4,964,038  10/1990  Louis et al. ..................... 364/200

FOREIGN PATENT DOCUMENTS 0471846  2/1992  European Pat. Off. ..

OTHER PUBLICATIONS

Abstract of Japan: vol. 12, No. 245 (P–729) 63–37441: Feb. 1988.

Abstracts of Japan: vol. 12, No. 303 (P–746) 63–75850; Apr. 1988.

*Primary Examiner*—Joseph Ruggiero
*Attorney, Agent, or Firm*—Cushman Darby & Cushman

[57] ABSTRACT

A control system including a motherboard having at least two auxiliary card connectors and a control bus on which control addresses and control data are transferred. Auxiliary cards are connected to the auxiliary card connectors of the motherboard. The auxiliary cards are effectively identical but have different control addresses for selective controlling through the control bus. The control addresses of the auxiliary cards are card location-specific and provided on the motherboard by wiring or switches or in some other corresponding manner. When an auxiliary card is inserted in an auxiliary card connector of the motherboard, the auxiliary card always obtains the correct address from the motherboard through the connector.

5 Claims, 2 Drawing Sheets

5,504,671

RADIO SYSTEM COMBINER FILTER CONTROL SYSTEM WHEREIN PLURAL AUXILIARY CARDS AUTOMATICALLY OBTAIN CORRECT ADDRESS FROM MOTHERBOARD UPON BEING INSERTED IN RESPECTIVE AUXILIARY CARD CONNECTORS

FIELD OF THE INVENTION

The invention relates to a control system comprising a motherboard having at least two auxiliary card connectors and a control bus on which control addresses and control data are transferred, and at least one auxiliary card connected to one of the auxiliary card connectors, the auxiliary card having a control address for selective controlling through the control bus.

BACKGROUND OF THE INVENTION

In various kinds of control systems a master unit typically controls slave units via a common control bus. Each control unit connected to the bus has a control address (identifier) for identifying the commands addressed to it from among the commands given on the common bus. In a module or circuit card implementing the slave unit, the control address is made by a fixed wiring, or the address can be set, e.g., by switches. Alternatively, every module or card may receive a dedicated control signal from the master unit. A drawback in this known solution is that with otherwise identical cards, it is necessary to know the address set or to be set for each card. The modules and cards used are thus different in respect of production, selling, installation or maintenance, and their installation requires specific settings or tuning.

SUMMARY OF THE INVENTION

The object of the invention is to provide a control system in which the above problems are eliminated.

This is achieved with a control system of the type described in the first paragraph, the system according to the invention being characterised in that the control address is card location-specific and the control address of the auxiliary card is not determined until the auxiliary card is connected to an auxiliary card connector, and that the motherboard comprises means connected to the auxiliary card connectors for providing control address data of the card location through the auxiliary card connector to the auxiliary card.

In the present invention, the control addresses of the auxiliary cards are card connector-specific and they are set by wiring, by switches or in some other corresponding manner on the motherboard. When the auxiliary card is connected to the auxiliary card connector of the motherboard, the auxiliary card always obtains the correct address from the motherboard through the connector. On account of the invention, the user need not set the required address data separately, which facilitates assembling, testing, installation and maintenance. In addition, the auxiliary cards are identical; they do not have any differences, not even in control addresses, in respect of production, selling, installation or maintenance.

BRIEF DESCRIPTION OF THE DRAWINGS

In the following, the invention will be described by means of preferred embodiments, with reference to the attached drawing, wherein.

DETAILED DESCRIPTION OF A PREFERRED EMBODIMENT

In principle, the present invention can be applied in any control equipment in which several identical auxiliary cards with different control addresses are to be connected to a motherboard or bus card comprising a common control bus. However, in the following, the invention will be exemplified by a control system which controls the combiner filters at a base station of a radio system. At the base station, several radio transmitters are connected to one antenna or antenna line so that each radio transmitter is connected through its own bandpass filter having a center frequency tuned to the transmission frequency of the radio transmitter. Bandpass filters of this kind are called combiner filters. A combiner filter supplies a transmission signal from the associated radio transmitter to the antenna with as low power losses as possible and, on the other hand, prevents—as effectively as possible—leakage of transmission signals generated by other radio transmitters at different frequencies into the associated radio transmitter from the direction of the antenna. Combiner bandpass filters may be fixedly tuned to predetermined transmission frequencies, or a combiner filter may be tuneable to a desired frequency. In the latter case, an adaptive control is usually involved with the combiner filter so as to minimize the losses in the filter.

Figure 1:
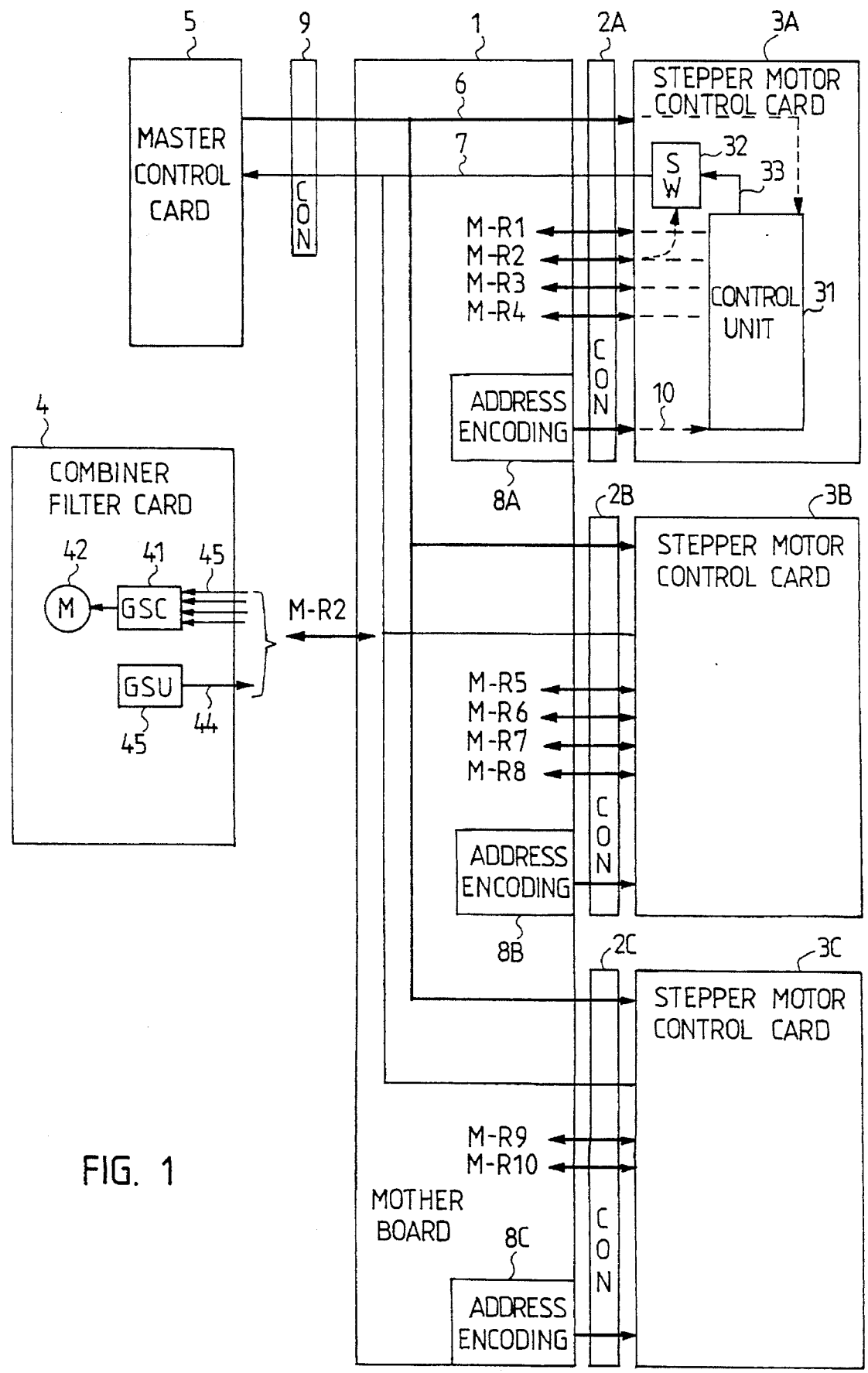
FIG. 1 shows a block diagram of a control system implemented in accordance with the invention for controlling combiner filters at a base station.

FIG. 1 shows a control system for combiner filters, An elementary unit of the control system is a motherboard 1, which comprises a common control bus 6. The motherboard 1 is connected by a card connector 9 to a master control card 5, which outputs control addresses and control data to the bus 6. The motherboard 1 also comprises at least two auxiliary card connectors 2A, 2B and 2C. An auxiliary card, in this embodiment a stepper motor control card 3A, 3B and 3C, is inserted into each of the connectors 2A, 2B and 2C, respectively. Further, the motherboard 1 is connected, either directly by a card connector or by cables, to a group of combiner filter units 4. Each of the combiner filter units comprises a stepper motor 42, which controls the center frequency of the combiner filter mechanically. The combiner filter card 4 also comprises control logic 41, which receives control signals 41 from the corresponding stepper motor control card 3A, 3B or 3C through a corresponding motor control bus M-R 1-10. The combiner card 4 also comprises at least one guard switch unit 45, which indicates when the motor 42 is in an extreme position, for example in zero position. The state of the guard switch 45 is indicated by a guard switch state line 44 to the corresponding stepper motor control card 3A, 3B or 3C. The state line 44 is part of each motor control bus M-R 1-10.

Figure 2:
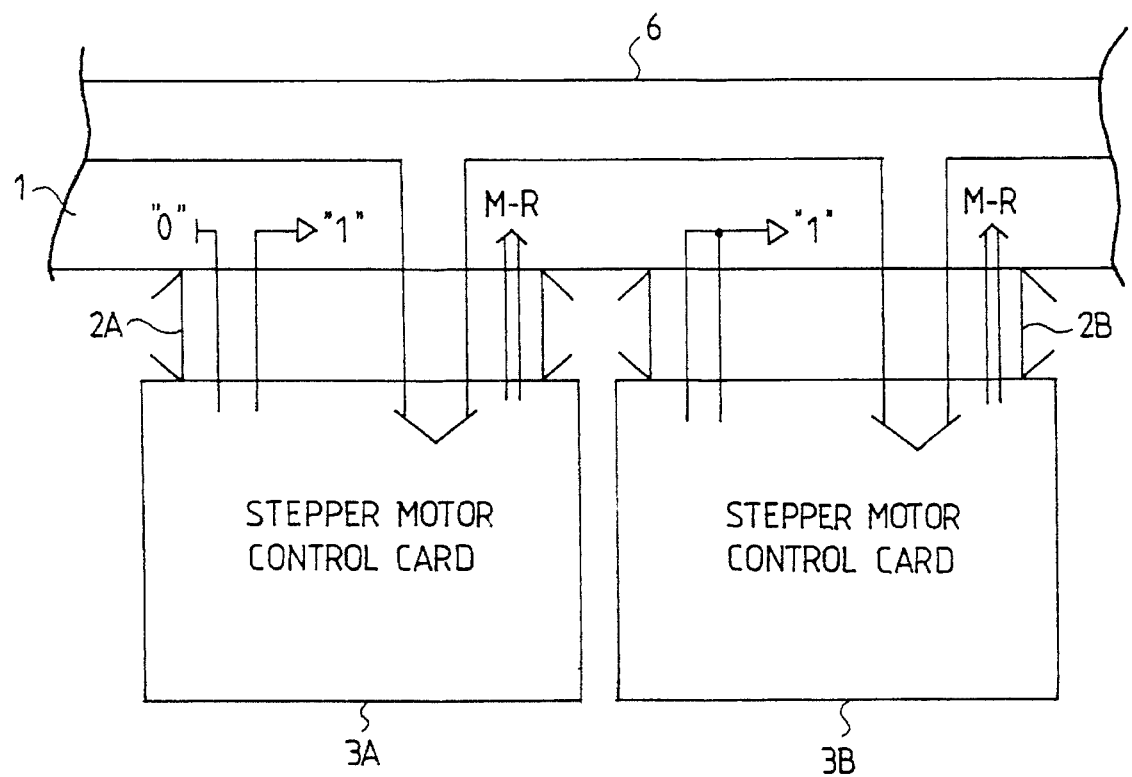
FIG. 2 illustrates inputting of control address data from the motherboard through a connector to an auxiliary card.

In accordance with the invention, the stepper motor control cards 3A, 3B and 3C are identical and they can be freely arranged in the card locations formed by card connectors 2A, 2B and 2C. For each card connector 2A, 2B and 2C, a dedicated card location-specific control address encoding circuitry 8A, 8B and 8C is provided on the motherboard 1, e.g. by fixed wiring, by adjustable code switches, or by some other corresponding solution. The encoded control address data are connected to predetermined signal lines in the card connectors 2A, 2B and 2C. For example, when the control card 3A is inserted in the connector 2A, the control address code 8A on the motherboard 1 will be connected through the connector 2A to lines 10 within the control card 3A, from where it can be read by a control unit 31 of the control card 3A. In the embodiment of FIG. 2, a 2-bit control address "01" wired to the motherboard 1 can be read by the control card 3A through the connector 2A. The control address indicates to the control card 3A which commands on the bus 6 are to be responded to in this card location and which combiner units 4 are controlled. Correspondingly, the control card 3B receives a 2-bit control address "11" wired to the motherboard through the connector 2B.

The control card 3A also comprises switching means 32 for switching guard switch state data 44 from the combiner card 4 to one or more common guard switch state lines 7 on the motherboard 1 when the control address of the corresponding card location is on the control bus 6. The control unit 1 monitors the bus 6 and controls the switching unit 32 by a control signal 33.

The encoding circuitry 8A, 8B and 8C on the motherboard 1 may also comprise other fixed card location-specific control information, such as the frequency data of the combiner unit to be controlled.

The drawing figures and their description are to be understood only as illustrating the present invention. In its details, the control system according to the application may vary within the scope of the attached claims.

I claim:

1. A control system for controlling radio system combiner filters, said control system comprising:

a motherboard having at least two auxiliary card connectors and a control bus on which control addresses and control data are transferred, and address logic associated with each of the auxiliary card connectors, for providing a card connector-specific control address through the respective auxiliary card connector to a respective auxiliary card when inserted into each respective auxiliary card connector;

a plurality of combiner filter units, each of which comprises a stepper motor, a control unit for the stepper motor, and a guard switch unit;

at least one stepper motor control card filter unit, each comprising a stepper motor control card inserted into a respective one of said auxiliary card connectors as a respective auxiliary card and adopting the respective said connector-specific control address of a respective one of said auxiliary card connectors;

a master controller, connected to said control bus of said motherboard for selectively controlling each said inserted stepper motor control card;

at least one guard switch state line common to each said inserted stepper motor control card, between said master controller and the respective said inserted stepper motor control card;

each said inserted stepper motor control card being arranged to supply guard switch state data received from the respective combiner filter unit, to said common switch state line, when said connector-specific control address of the respective auxiliary card connector appears on said control bus.

2. The control system according to claim 1, wherein:

said address logic comprises wired encoding circuitry provided on said motherboard.

3. The control system according to claim 1, wherein:

said address logic comprises encoding switches provided on the motherboard.

4. The control system according to claim 1, wherein:

said address logic further provides fixed control information associated with the respective card connector through the respective card connector to the respective said installed stepper motor control card.

5. The control system according to claim 4, wherein:

said address logic provides data about the operating frequency of the respective combiner filter unit through the respective auxiliary card connector to the respective installed stepper motor control card.

* * * * *